United States Patent Office 3,062,806
Patented Nov. 6, 1962

3,062,806
1:2-METAL COMPLEXES OF MONOAZO DYES CONTAINING A 1,2-DIPHENYL-3,5-DIKETOPYRAZOLIDINE COUPLING COMPONENT
Walter Biedermann and Guido Schetty, Basel, Switzerland, assignors to J. R. Geigy A.-G., Basel, Switzerland
No Drawing. Filed Aug. 5, 1960, Ser. No. 47,623
Claims priority, application Switzerland Aug. 7, 1959
4 Claims. (Cl. 260—147)

The invention concerns metallisable azo dyestuffs and the complex metal compounds thereof, a process for the production thereof as well as their use for the dyeing of textile material. The invention also concerns, as industrial product, the materials dyed with these new dyestuffs.

It has been found that valuable metallisable azo dyestuffs are obtained if diazotised aromatic amines of the benzene and naphthalene series which, in the o-position to the amino group, contain a metallisable group or a group which can be converted into such, are coupled with a 3,5-diketopyrazolidine and the azo dyestuff obtained, possibly mixed with any other metallisable azo dyestuff desired, is converted either in substance or on the fibre, into its metal complex.

Diazotised 2-amino-1-carboxyaryl, 2-amino-1-alkoxyaryl and, advantageously 2-amino-1-hydroxyaryl compounds, in particular of the benzene series, are used as diazo components. The diazo components used according to the invention can also contain arylazo groups in addition to the substituents usual in azo dyestuffs.

These diazo components are diazotised by the usual methods in mineral acid with alkali nitrite.

As coupling components, the 3,5-diketopyrazolidines coupling in the 4-position, particularly those coupling at the nitrogen atom, i.e. derivatives organically substituted in the 1- and 2-positions can be used. Preferred dyestuffs are those from 1,2-disubstituted derivatives in which the N-substituents can be the same as or different from each other.

The nitrogen substituents of the coupling components can be alkyl groups such as, e.g. the methyl, ethyl, n-propyl, isopropyl, n-butyl or hexyl group; cycloalkyl groups such as e.g. the cyclohexyl group; aralkyl groups such as e.g. the benzyl group; heterocyclic groups such as e.g. the benzthiazolyl-(2) or the quinolinyl-(2) group; and homocyclic aryl groups such as e.g. naphthyl and, advantageously, phenyl groups.

The coupling is performed advantageously in a weakly acid to weakly alkaline, aqueous medium at 0–20° C., possibly with the addition of organic solvents miscible with water, for example, lower alcohols, ethers or organic nitrogen bases.

In the dyestuffs according to the invention, the aryl nuclei can contain inert substituents, for example halogens such as fluorine, chlorine or bromine; aliphatic groups such as methyl, ethyl, isopropyl, tert. butyl or tert. amyl groups; cycloaliphatic groups such as the cyclohexyl group; araliphatic groups such as the benzyl groups; homocyclic-aromatic groups such as phenyl, methylphenyl, chlorophenyl or methoxyphenyl groups; ether groups such as the methoxy, ethoxy, hydroxyethoxy and phenoxy groups; also nitro, trifluoromethyl, cyano, hydrocarbon carbonyl or acylamino groups, in particular also the groups improving the water solubility such as the sulphamyl group and sulphamide groups organically substituted at the nitrogen atom, for example by lower alkyl, hydroxyalkyl, cycloalkyl, aralkyl or phenyl groups, also sulphamide groups derived from saturated hetero rings containing nitrogen such as piperidine, morpholine or piperazine, as well as low molecular aliphatic sulphonyl groups such as the methyl, chloromethyl, ethyl, isopropyl, hydroxyethyl or vinyl sulphonyl groups. Finally, the dyestuffs according to the invention suitable for textile dyeing can also contain the usual acid, salt-forming groups, for example the carboxyl or the sulphonic acid group.

The azo dyestuffs according to the invention can be converted into their complex heavy metal compounds either in substance or on the fibre by treatment with agents giving off metal, in particular with agents giving off chromium or also cobalt. The simple or complex chromium salts can be used as agents giving off chromium, for example chromic fluoride, chromic sulphate, chromic acetate, chromic formate, chromic salts of aryl sulphonic acids and the alkali or ammonium salts of disalicylatochromic acids. Also salts of hexavalent chromium can be used as agents giving off chromium, for example the alkali and ammonium chromates or bichromates, this particularly when acid wool dyeings are being after-chromed or when chroming dyestuffs in substance in the presence of reducing agents, in particular in the presence of reducing sugars.

The usual salts of cobalt such as cobalt acetate, cobalt sulphate, cobalt chloride or cobalt hexamminetrichloride are used as agents giving off cobalt. The presence of complex formers for example of alkali tartrates, is advantageous in the metallisation process.

The azo dyestuffs according to the invention are metallised in the most simple case, i.e. when they are sufficiently soluble in the reaction medium, in aqueous solution or suspension at the boil. Often the addition of organic solubility promoters is indicated, as which can be used, for example, lower alcohols, lower ether alcohols, lower ketones and amides of lower fatty acids.

If it is intended to produce complex metal compounds which contain two molecules of the same or different azo dyestuffs to one metal atom, then the agents giving off metal is used under such conditions and, possibly, in such amounts, that there is less than one metal atom to one molecule of azo dyestuff. In this case the metallisation is performed advantageously in neutral to alkaline medium at temperatures of 80–140° C., if necessary under pressure.

However, if it is intended to produce complex metal compounds which contain one molecule of azo dyestuff to one metal atom, e.g. a chromium atom, then the azo dyestuff is treated advantageously with an excess of the agent giving off metal, in particular an agent giving off chromium, advantageously in an acid medium at pH values of 2 to 5 and at temperatures of over 100° C. if necessary under pressure. The chromium-containing dyestuffs which contain 1 metal atom per dyestuff molecule bound in complex linkage are valuable for the production of uniform mixed complexes according to the invention by adding a different metallisable dyestuff to the 1:1 complex in an alkaline medium.

Those metal compounds which contain 1 metal atom to 2 molecules of azo dyestuff are preferred.

In these so-called 2:1 complexes there should be at most one acid, salt-forming group not taking part in the complex formation per complex dyestuff molecule, advantageously a sulphonic acid group or, also, a carboxyl group, in the form of their alkali metal or ammonium salts. The presence of a sulphonic acid group is favourable if at least one of the dyestuffs bound in complex linkage is a disazo dyestuff.

In general, however, 2:1 complexes formed from unsulphonated monoazo dyestuffs are preferred for the dyeing of polypeptide fibres from a neutral to weakly acid bath, it being favourable for the dyeing behaviour when there is a substituent promoting water solubility present for each azo group present. This is also true of the 2:1 complexes containing disazo dyestuffs. In addition to the sulphamyl and suphonyl groups given above as substituents promoting water solubility, also acylamino groups derived from low molecular acids, e.g. acetylamino, carbomethoxyamino, methylsulphonylamino, ethylsulphonylamino, chlorosulphonylamino and, possibly, lower ether groups can be used.

The suitability of the heavy metal-containing dyestuffs according to the invention for textile dyeing can be further increased by mixing them with additives, for example by mixing with capillary active wetting and dispersing agents, alkali phosphates or with salts having an alkaline reaction such as alkali carbonates.

Naturally heavy metal-containing dyestuffs according to the invention of the type: two different dyestuff molecules per heavy metal atom, can also be produced by metallising mixtures of dyestuffs, a component of which mixtures is at least one azo dyestuff as defined.

Depending on their composition, the heavy metal-containing dyestuffs according to the invention are suitable for the dyeing of textile materials from an aqueous bath or in the spinning mass; they are also suitable for the dyeing of lacquers and varnishes in light fast yellow, orange, brown to red shades. The water soluble dyestuffs are particularly suitable for the dyeing of natural or synthetic polypeptide fibres from a neutral to weakly acid bath, for example, for the dyeing of wool, silk, leather, resins, synthetic polyamide and polyurethane fibres. The dyeing attained therewith are distinguished by very good fastness to light and their evenness as well as by good fastness to washing, sea water, decatising, alkali and rubbing.

Particularly valuable are dyestuffs selected from the class consisting of the azo dyestuffs having the formula

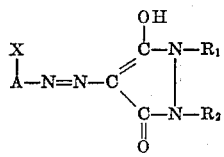

wherein:

A represents a benzene radical,

X represents a metallisable group in o-position to the azo group selected from the group consisting of —OH and —COOH, $R_1$ represents a benzene radical, and $R_2$ represents a member selected from the group consisting of hydrogen, lower alkyl and benzene radicals, and the chromium and cobalt complexes of said dyestuffs containing one metal atom in complex linkage with two molecules of dyestuff.

Of these, the 2:1 chromium and cobalt complexes of monoazo dyestuffs of the above formula are again preferred in which $R_1$ and $R_2$ represent the phenyl radical and A contains no sulphonic acid groups or carboxylic acid groups not taking part in the complex formation. However, A advantageously contains an alkylsulphonyl or a sulphamide group.

The following examples serve to illustrate the invention. Where not otherwise stated, parts are given as parts by weight and the temperatures are in degrees centigrade. The relationship of parts by weight to parts by volume is as that of kilogrammes to litres.

*Example 1*

18.7 parts of 2-amino-1-hydroxybenzene-4-methyl sulphone in 200 parts of water and 17 parts of concentrated hydrochloric acid are diazotized at 0–5° with the solution of 6.9 parts of sodium nitrite in 20 parts of water. The pH of the suspension is adjusted to 4 by the addition of sodium bicarbonate and it is then added at 0–5° while stirring to a solution of 26 parts of 1,2-diphenyl-3,5-diketopyrazolidine, 4.1 parts of sodium hydroxide and 12 parts of sodium carbonate in 500 parts of water. After a few hours, the coupling is complete and the monoazo dyestuff formed is isolated. It corresponds to the formula

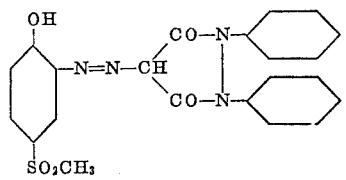

and dyes wool on boiling in a dyebath containing ammonium sulphate and potassium bichromate in orange shades which are fast to light and wet.

45 parts of this monoazo dyestuff in 500 parts of formamide and 13.6 parts of chromic acetate, containing 2.9 parts of chromium, are heated for 3 hours at 110–120°, and the mixture is stirred into 2000 parts of a cold 20% sodium chloride solution. The precipitated dyestuff, which corresponds to the formula

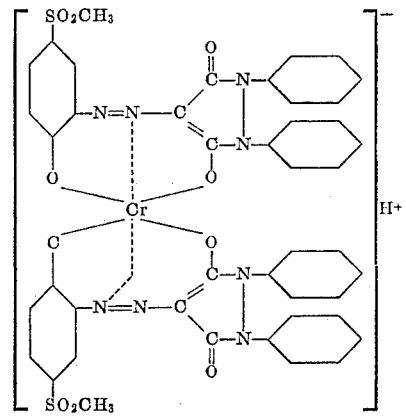

is filtered off, washed and dried. It is an orange powder which dyes wool from a neutral to weakly acid bath in orange shades which have good wet fastness properties and very good fastness to light.

Similar chromium-containing dyestuffs are obtained if the 26 parts of 1,2-diphenyl-3,5-diketopyrazolidine are replaced by 35.0 parts of 1,2-di-(3'-nitrophenyl)-3,5-diketopyrazolidine or by 28.8 parts of 1,2-di-(4'-methylphenyl)-3,5-diketopyrazolidine.

*Example 2*

45 parts of the metal-free monoazo dyestuff obtained according to Example 1 are heated in 1000 parts of water and 30 parts of sodium carbonate at 80°. A solution of 13.1 parts of crystallised basic cobalt acetate in 52.5 parts of water is added to this solution and the mixture is kept at 80° until the original dyestuff has disappeared. The cobalt-containing dyestuff is then salted out, filtered off and dried. It is a brown-yellow powder which dyes wool from a neutral to weakly acid bath in yellow shades.

Similar cobalt-containing dyestuffs are obtained if in the above example, corresponding amounts of dyestuffs are used which have been produced by the process according to Example 1 using 35 parts of 1,2-di-(3'-nitrophenyl)-3,5-diketopyrazolidine, 28.8 parts of 1,2-di-(4'-methylphenyl)-3,5-diketopyrazolidine, 32.1 parts of 1,2-di-(4'-chlorophenyl)-3,5-diketo-pyrazolidine or 31.2 parts of 1,2-di-(4'-methoxyphenyl)-3,5-diketopyrazolidine as azo components.

*Example 3*

13.7 parts of 2-aminobenzene-1-carboxylic acid in 300 parts of water and 70 parts of concentrated hydrochloric acid are diazotised at 0–5° with the solution of 6.9 parts of sodium nitrite in 20 parts of water. At 0–5°, the diazonium salt solution is poured into a solution of 4.1 parts of sodium hydroxide, 12 parts of sodium carbonate and 26.0 parts of 1,2-diphenyl-3,5-diketopyrazolidine in 300 parts of water. After a few hours, the coupling is complete. The dyestuff is filtered off and dried.

The dry dyestuff is heated for a few hours at 115–120° with 300 parts of formamide and 13.6 parts of chromic acetate, containing 2.9 parts of chromium. The mixture is then poured into 1200 parts of a 20% sodium chloride solution, the precipitated product is filtered off, washed and dried. The yellow powder obtained which corresponds to the formula

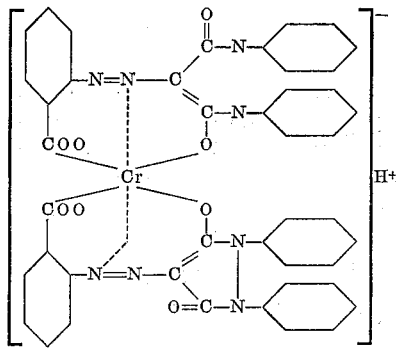

dyes wool and nylon in a neutral to weakly acid bath in yellow shades which have good fastness to light.

Similar dyestuffs are obtained if in the above example, instead of 2-amino-1-carboxylic acid, 15.1 parts of 3-methyl-2-aminobenzene-1-carboxylic acid or 23.0 parts of 2-aminobenzene-1-carboxylic acid - 5 - sulphonic acid methylamide are used as diazo components.

Example 4

The diazoxide, which is obtained by diazotising 29.2 parts of 3-amino-4-hydroxyazobenzene-3'-sulphonic acid amide, is suspended in 400 parts of water. A solution of 26.0 parts of 1,2-diphenyl-3,5-diketopyrazolidine, 4.1 parts of sodium hydroxide and 10 parts of sodium carbonate in 300 parts of water is poured in. When the dyestuff formation is complete, a further 400 parts of water and 38.5 parts of the monoazo dyestuff from diazotised 1 - hydroxy - 2 - aminobenzene - 4 - sulphonic acid methyl amide and 1-phenyl-3-methyl-5-pyrazolone in the form of its sodium salt are added.

The dyestuff mixture is heated to 65–75°. A solution of 26.2 parts of crystallised basic cobalt acetate in 100 parts of water is added to the mixture and the whole is heated until the complex formation is complete. The dyestuff formed is salted out, filtered off, washed and dried. It is a brown-yellow powder which dyes wool from a neutral to weakly acid bath in yellow-brown shades. As component, it contains the mixed complex of the following constitution:

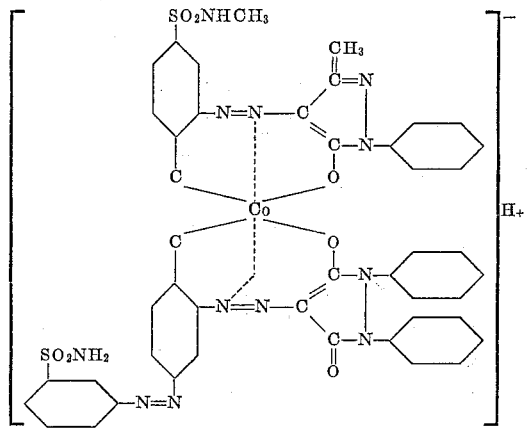

Example 5

256 parts by volume of a 0.5 molar aqueous solution of the sodium salt of disalicylato chromic acid are added to a solution of 40.0 parts of the metal-free azo dyestuff produced according to paragraph 1 of Example 3, 45.0 parts of the azo dyestuff from diazotised 2-amino-1-hydroxybenzene-4-sulphonic acid methylamide and 1-methane sulphonylamino-7-hydroxynaphthalene in 1500 parts of water and the whole is heated at 100°. The mixture is kept at the boil until the complex formation is complete. The dystuff formed which, as component, contains the mixed complex of the formula

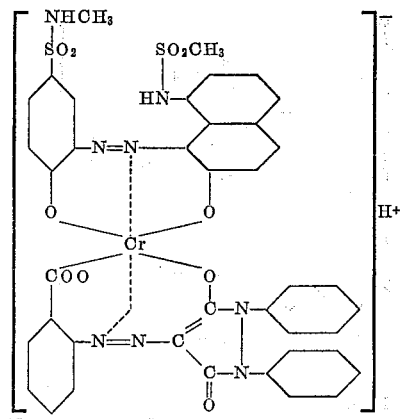

is salted out, filtered off, washed and dried. It dyes wool in olive green shades.

Example 6

18.8 parts of 2-amino-1-hydroxybenzene-5-sulphonic acid amide in 200 parts of water and 17 parts of concentrated hydrochloric acid are diazotised with the solution of 6.9 parts of sodium nitrite in 20 parts of water. The suspension of the diazoxide is poured at 0° into a solution consisting of 19.0 parts of 1-phenyl-2-methyl-3,5-diketopyrazolidine, 4.1 parts of sodium hydroxide, 15 parts of sodium carbonate and 300 parts of water. When no more diazonium compound can be traced, 128 parts by volume of a 0.5 molar aqueous solution of the sodium salt of disalicylato chromic acid are added to the reaction mixture and the mixture is boiled for some hours. The metal-containing dyestuff formed which corresponds to the formula

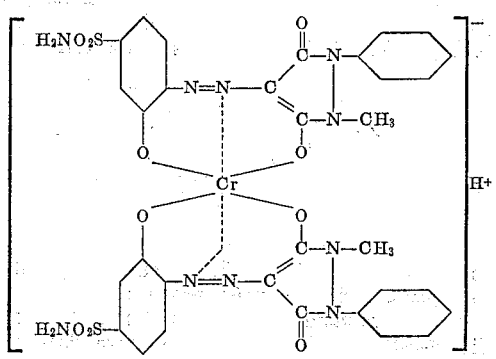

is salted out, filtered off, washed and dried. It is an orange powder which dyes wool from a weakly acid bath in red-orange shades which have very good fastness to light.

Similar dyestuffs are obtained if the coupling component in this example is replaced by 22.4 parts of 1-(4'-chlorophenyl)-2-methyl-3,5-diketopyrazolidine or by 20.4 parts of 1-phenyl-2-ethyl-3,5-diketopyrazolidine.

Example 7

15.4 parts of 4-nitro-2-amino-1-hydroxybenzene in 400 parts of water and 17 parts of concentrated hydrochloric acid are diazotised with the solution of 6.9 parts of sodium nitrite in 20 parts of water. A solution of 18.1 parts of 1-phenyl-3,5-diketopyrazolidine, 4.1 parts of caustic soda lye and 15 parts of sodium carbonate in 200 parts of water is poured at 0° into the suspension of the diazonium compound. When the dyestuff formation is complete, the mixture is heated to 80° and a solution of 13.6 parts of crystallised basic cobalt acetate in 52.5 parts of water is added. On completion of the complex formation, the dystuff is salted out, filtered off, washed and dried. It is a brownish powder which dyes lacquers or spinning masses in brownish-yellow shades. The complex corresponds to the formula

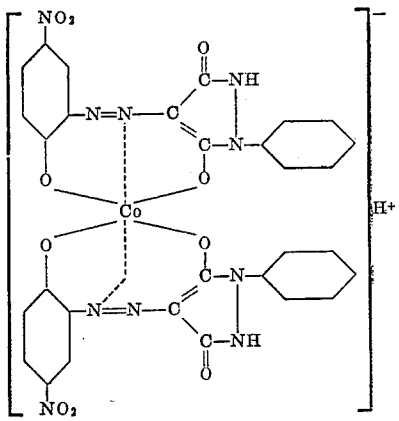

A similar dyestuff is obtained if the diazo component used in this example is replaced by 14.4 parts of 4-chloro-2-amino-1-hydroxybenzene.

*Example 8*

22.35 parts of 4-chloro-2-amino-1-hydroxybenzene-6-sulphonic acid and 4.0 parts of caustic soda lye are dissolved with a neutral reaction in 170 parts of hot water. A solution of 6.9 parts of sodium nitrite in 100 parts of water is then added, the mixture is cooled to 10° and at 0° is added to a mixture of 23 parts of concentrated hydrochloric acid and 23 parts of water. To the diazonium compound so produced is then poured at 0° a solution consisting of 26.0 parts of 1,2-diphenyl-3,5-diketopyrazolidine, 4.1 parts of sodium hydroxide, 12 parts of sodium carbonate and 200 parts of water. The temperature is allowed to reach room temperature within a few hours. When the coupling reaction is complete, the dyestuff is filtered off, washed and dried. It is a brown-red powder which corresponds to the formula

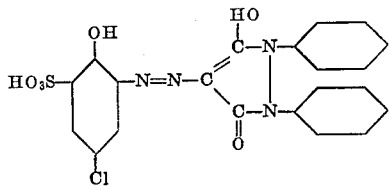

Dyed onto wool by both the single bath and the after-chroming process, the dyestuffs produce beautiful red shades which have good fastness to milling and light.

Similar dyestuffs are obtained if the above diazo components are replaced by 23.4 parts of 4-nitro-2-amino-1-hydroxybenzene-6-sulphonic acid, 23.4 parts of 6-nitro-2-amino-1-hydroxybenzene-4-sulphonic acid or by 21.7 parts of 2-amino-1-carboxybenzene-5-sulphonic acid.

*Example 9*

2 parts of the chromium compound according to Example 1 are dissolved in 4000 parts of water and 100 parts of previously wetted wool are introduced into the dyebath at 40–50°. The bath is brought to the boil within half an hour, kept boiling for 45 minutes and then the wool is rinsed with cold water and dried. The orange dyeing obtained has good wet fastness properties and good fastness to light.

An equally good dyeing is obtained if the 100 parts of wool are replaced by 100 parts of nylon.

What we claim is:
1. A complex heavy metal compound which contains one atom of a metal selected from the group consisting of cobalt and chromium in complex union with two azo dyestuff molecules free from sulphonic acid and carboxylic acid groups not taking part in the complex formation of the general formula

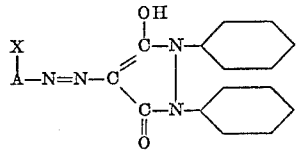

wherein A represents a benzene radical and X represents a metallisable group in o-position to the azo group selected from the group consisting of —OH and —COOH.

2. The complex chromium compound of the formula

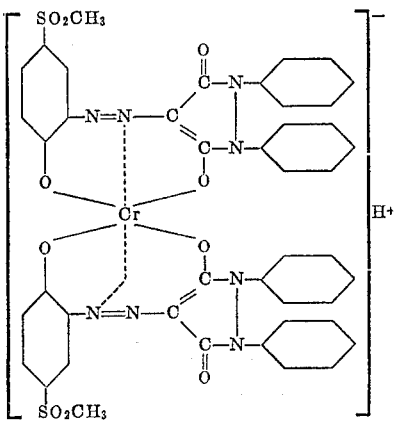

3. The complex cobalt compound of the formula

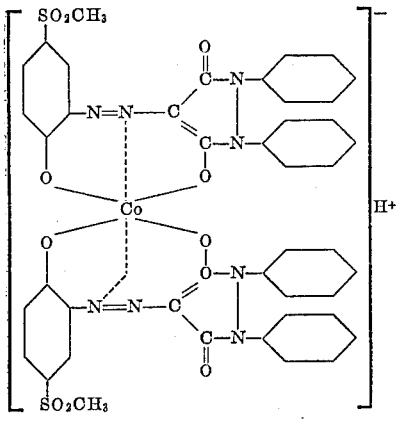

4. The complex chromium compound of the formula

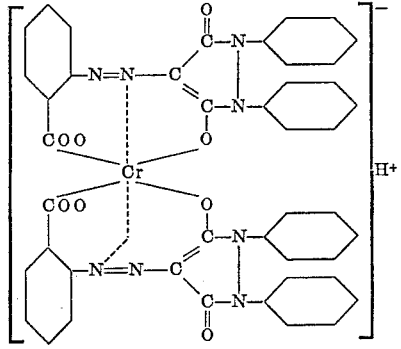

References Cited in the file of this patent

UNITED STATES PATENTS 2,427,911    Kendall et al. ---------- Sept. 23, 1947
2,908,677    Straley et al. ---------- Oct. 13, 1959
(U.S. counterpart of Canadian patent)

FOREIGN PATENTS 571,684    Canada ---------------- Mar. 3, 1959